United States Patent [19]

Kuester et al.

[11] Patent Number: 4,814,795

[45] Date of Patent: Mar. 21, 1989

[54] INK JET HEAD HOLDER

[75] Inventors: Kevin W. Kuester; Donald L. Freed, Jr., both of Belleville, Ill.

[73] Assignee: Marsh Company, Belleville, Ill.

[21] Appl. No.: 45,832

[22] Filed: May 1, 1987

[51] Int. Cl.[4] .............................................. G01D 15/16

[52] U.S. Cl. .................................. 346/140 R; 346/75; 346/145; 400/55

[58] Field of Search ........... 346/139 R, 139 D, 139 C, 346/140 PD, 140 R, 75, 145; 400/55, 56

[56] References Cited

U.S. PATENT DOCUMENTS 3,904,010 9/1975 Krauss et al. ......................... 400/56

FOREIGN PATENT DOCUMENTS 0088630 9/1983 European Pat. Off. ........ 346/140 R 0012882 1/1984 Japan ...................................... 400/55

OTHER PUBLICATIONS

Humphreys, "Floating Platen For Printing On Irregular Contours", IBM Tech. Disclosure, p. 179, vol. 15, No. 1, 06/72.

D. K. Rex, "Print Head Spacing Adjustment For Paper Thickness", IBM Bulletin, 08/83, vol. 26, No. 3B.

D. K. Rex, "Printhead Adjustment", IBM Bulletin, vol. 26, No. 12, 05/84.

R. L. Smith, "Self-Compensating Printhead-To-Paper Gap", IBM Bulletin, vol. 26, No. 3B, 08/83.

*Primary Examiner*—E. A. Goldberg

*Assistant Examiner*—Huan H. Tran

*Attorney, Agent, or Firm*—Rogers, Howell, Moore & Haferkamp

[57] ABSTRACT

An ink jet head holder supported from a frame and includes a transversely movable rod supporting an ink jet print head with a similar print head holder on the opposite side of the frame. A conveyor for conveying an object having opposed print-receiving surfaces between the print heads. Longitudinal channels are supported by the frame on opposite sides of the conveyor. The print heads are supported on the longitudinal channels and side guide rails are also supported on the channels. The channels are laterally movable to vary the width of the path of packages on the conveyor. The side guide rails are also adjustable laterally relative to the print heads. The print heads have cam faces for contacting the packages at a predetermined transverse distance from the print head nozzles. Biasing means hold the print heads with the cam faces bearing against the print-receiving surfaces that are printed by ink from the nozzles.

16 Claims, 4 Drawing Sheets

FIG. 6.
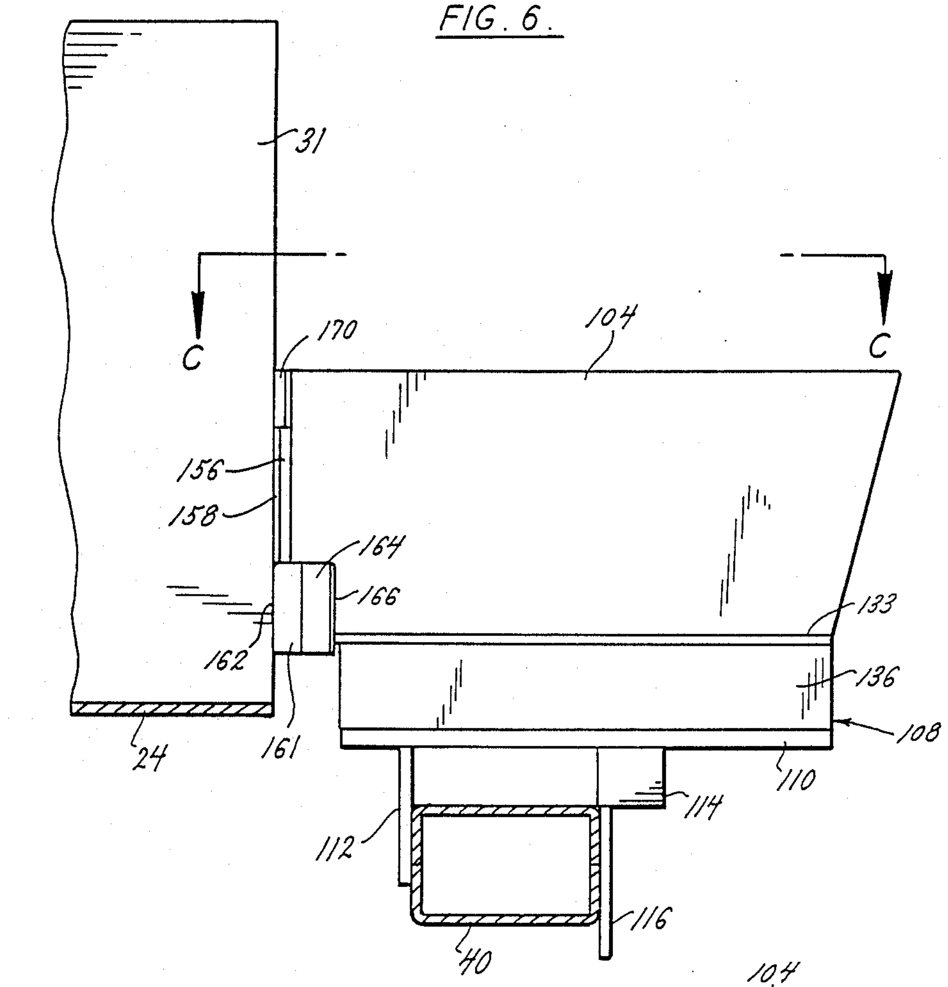
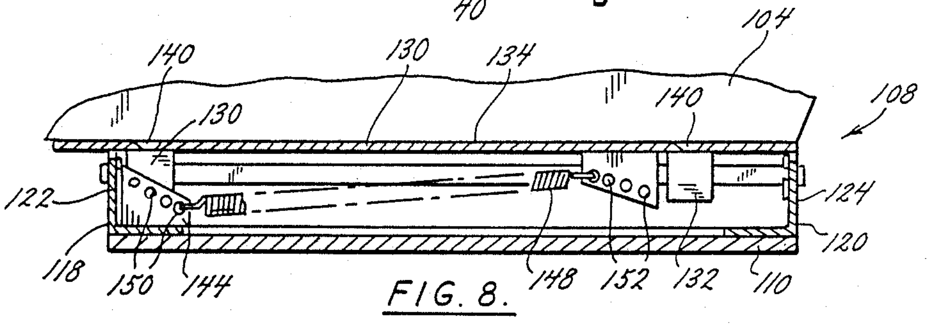
FIG. 8.
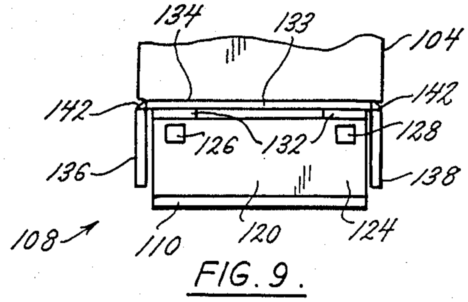
FIG. 9.

INK JET HEAD HOLDER

BACKGROUND OF THE INVENTION

This invention relates to ink jet printing apparatus and more particularly to a control mechanism for maintaining a substantially constant spatial relationship between one or more ink jet print heads and print-receiving surfaces, such as on one or opposite sides of an object moving past the print heads.

The control mechanism of this invention is adapted to be incorporated into an ink jet printing apparatus of the kind that can be operated to print indicia onto a substrate. The indicia can be characters, symbols and, in more recent developments of the art, bar codes. Such ink jet printing apparatus generally includes- one or more print-heads.

Each print head has a vertical array of orifice nozzles from which ink can be emitted under pressure in the form of droplets emerging from the print head for impact upon the substrate. The nozzles are connected through individual valves to an ink source that is maintained under pressure. A programmable controller regulates the operation of the valves to cause ink to flow through them to and to be emitted from the nozzles according to a pre-selected pattern or patterns. In this way, the ink droplets form the desired symbol, character, or bar codes on the substrate.

When ink is emitted from an ink jet nozzle, it must travel a small fraction of an inch to form an ink droplet. This ink droplet grows wider as the distance of travel from the nozzle increases. As the width of the droplet increases, a larger dot will be printed upon a substrate impacted by the droplet. As a result, as the droplet gets wider, the outer edges of the printed dot lose precision, and the quality of the printing deteriorates.

In a typical installation, the substrate moves relative to the print head or print heads. For example, the substrate may be defined as one or more surfaces on a package such as a carton or container, and there may be a plurality of such packages in a row on a conveyor that transports the packages successively past the print head or print heads. It is common to have one or more print heads on opposite sides of the conveyor so that printing can be done on opposite faces of the package simultaneously.

To guide the packages into position relative to the print head or print heads, guide rails have been provided on opposite sides of the conveyor. These guide rails define planes that are spaced a predetermined distance from the print head nozzles, and the guide rails hold the packages between them as they are transported by the conveyor. However, packages of the same nominal size vary in width due to manufacturing and friction tolerances and there are undulations in the faces of the packages. Therefore, the span between guide rails must be great enough to accommodate the widest of the packages as permitted by the size tolerances. Accordingly, although the guide rails hold the packages at nominal distances from the print head nozzles, those distances vary as different package surfaces pass the nozzles and are imprinted.

Printing quality has always been important in the ink jet printing art. Efforts have been made to improve the quality of ink jet printing, resulting in improvements in the design of the nozzles, such as by the incorporation of jewel led orifice nozzles, and resulting in improvements in the composition of the inks. Examples of the results of some of these efforts are set forth in U.S. Pat. No. 4,378,564. As a result of these kinds of efforts and developments, the quality of ink jet printing has improved greatly, and ink jet printing has succeeded in meeting the requirements of a growing number of diverse applications.

In all of these applications to date, an optimum range of spacing between the ink jet nozzles on the print head and the substrate has existed and print quality has been limited by the tolerance in this spacing that has accommodated the variations in sizes of the packages. However, as the art continues to develop, the desire and demand for even increased printing quality have increased. Moreover, with the introduction of machine readable ink jet printing, such as the printing of bar codes, the need for more precise printing has emerged.

SUMMARY OF THE INVENTION

For this ink jet head holder, a frame supports a moving conveyor upon which packages, such as cartons, containers or the like can be transported. In a typical installation, there are printing stations on opposite sides of the conveyor and each printing station incorporates a plurality of print heads. Longitudinal channels are supported by the frame on opposite sides of the conveyor.

Side guide rails are supported by the channels also on opposite sides of the conveyor to function as lateral guides to guide the packages past the print heads as they are transported by the conveyor. The print heads are also supported by the channels, and the channels are connected to the frame by threaded rods that allow the positions of the channels to be adjusted laterally relative to the conveyor. Lateral adjustment of the channels adjusts the given span between the side guide rails and the span between the printing stations for accommodating different widths of packages. Thus, a run of packages of one nominal size can be completed, the channels can be laterally moved, and a run of packages of another nominal size can follow.

The rails are supported on the channels by special adjustable mounts. The adjustable mounts allow the rails to be moved laterally relative to the print heads to provide adjustment between the lateral positions of the rails and the print heads, and also to allow adjustment of the angle of incidence of the rails relative to vertical planes if inclination of the rails is desired, such as to limit contact by only an upper or only a lower rail with the packages.

The inventors have further determined that it is critical to be able to select and maintain a substantially constant distance between the orifice nozzle outlet faces and the substrate or substrates defined by the package surfaces onto which the ink droplets are deposited and thus select and maintain substantially constant the distance traveled by the ink droplets. This desired distance is in the range of one-sixteenth inch. The present invention allows the desired distance to be accurately selected and maintained in spite of package size tolerances and substrate surface undulations. In particular, the present invention provides a mechanism for maintaining constant the spatial relationship between the print head and the portion of the print-receiving surface in the path of the eject ink. The mechanism is responsive to variations and undulations in the print-receiving surface that at about the moment of the response, will be in alignment with the portion of the print-receiving surface that is in the path of the ejected ink, wherein the alignment is generally normal to the path of movement of the moving object. The resulting high quality of printing enables ink jet printing apparatus to print bar codes accurately for accurate machine readability.

To enable this selection and maintenance of the distance traveled by the ink droplets, each print head is mounted on a laterally slidable bracket supported by the channel. Biasing means, such as a spring, biases the bracket toward the conveyor. A cam plate on the face of the print head is held in contact with the package as the package moves past the print head, and the contact surface of the cam plate sets the desired distance between the outlet of the orifice nozzle and the substrate. The biasing means causes the print head to remain in position with the cam plate in constant contact with the substrate to thereby maintain the distance constant between the orifice nozzle faces and the substrate.

The cam plate is curved or bent laterally outward at its leading end, so that as a package approaches, it will not jam against the cam plate but will engage the lead surface and cause an outward camming action. The span between the face of the cam plate and the face of the nozzles represents the travel distance of the ink jet droplets. Since the biasing means holds this cam plate face against the package surface even though the package width may vary or the surface may have undulations, the travel distance is maintained constant. After the package passes the print head, it releases the cam plate and the biasing means can cause the print head to slide inward again.

BRIEF DESCRIPTION OF THE DRAWINGS

FIG. 6 is an enlarged view in section taken along the plane of the line B—B of FIG. 1;

FIG. 8 is a view in section of the print head mount but with the print head removed, as viewed along the plan of the line D—D of FIG. 7; and FIG. 9 is an end view of the print head mount, as viewed from the right of FIG. 8.

DETAILED DESCRIPTION OF PREFERRED EMBODIMENT

Figure 2:
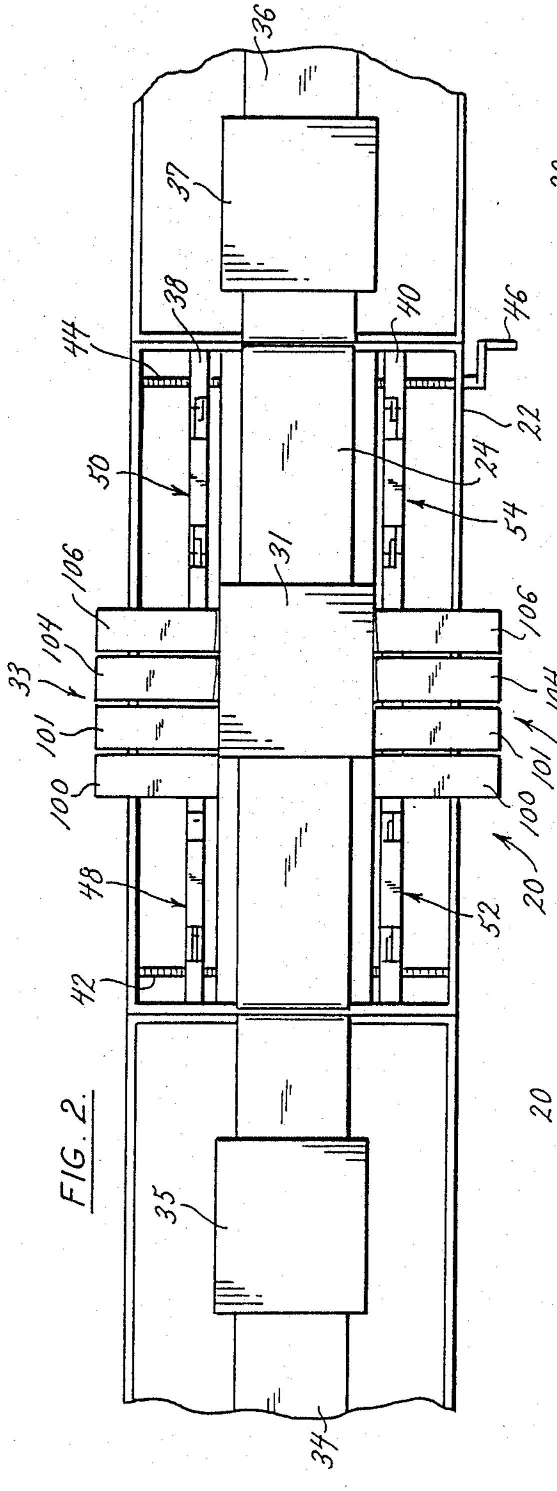
FIG. 2 is a top plan view of the invention.
Figure 3:
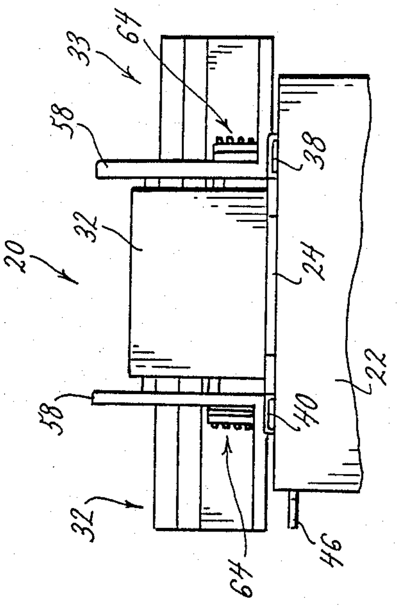
FIG. 3 is an end elevation view of the invention, as viewed from the right end of FIG. 1.
Figure 1:
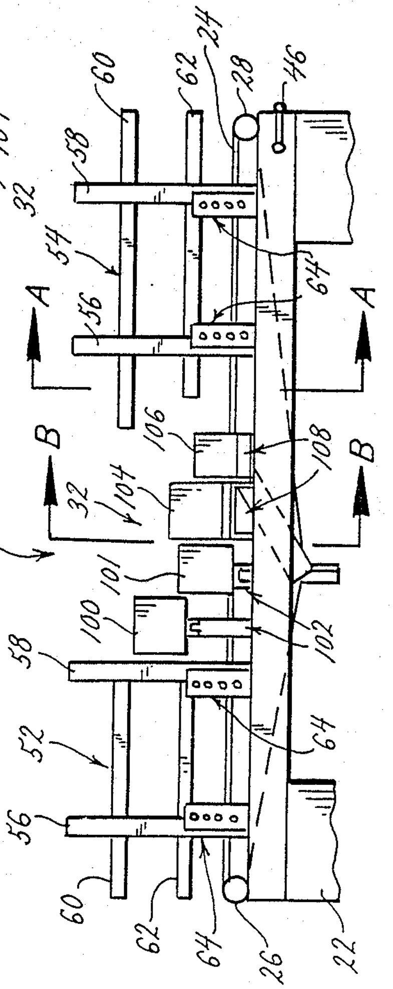
FIG. 1 is a schematic side elevation view of the invention.

The ink jet print head holder 20 of this invention incorporates a conventional frame 22. A conveyor 24 is supported on rollers 26 and 28 and is driven by a conventional drive mechanism (not shown) in a longitudinal direction about the rollers 26 and 28. The conveyor 24 transports packages, like the carton 31, past print head stations 32 and 33 on opposite sides of the conveyor 24. In a typical installation, the conveyor 24 is positioned in proximity to a delivery conveyor 34 that constantly delivers cartons, such as the carton 35 onto the conveyor 24. Also, a conveyor 36 transports imprinted cartons, like the carton 37, from conveyor 24.

A pair of side channels 38 and 40 extend longitudinally on opposite sides of the conveyor 24. The side channels 38 and 40 are supported on threaded rods 42 and 44 that are journalled in the frame 22 and that can be rotated by a hand crank 46. The rods 42 and 44 are connected by suitable means, such as a belt or chain (not shown) so that operation of the crank rotates both rods 42 and 44. The rods 42 and 44 are threaded through the channel members 38 and 40 so that when the rods are rotated, the channel members 38 and 40 are moved simultaneously inwardly or simultaneously outwardly with respect to the conveyor 24. This allows a gross width adjustment between the channel members 38 and 40 to accommodate different widths of cartons 32 for purposes that will appear.

The channel member 38 supports two left rail assemblies 48 and 50, and the channel member 40 supports two right rail assemblies 52 and 54. Each rail assembly 48, 50, 52 and 54 has a pair of upright members 56 and 58 and upper and lower horizontal rails 60 and 62. Each upright member 56 and 58 is supported from a side channel 38 or 40 by a special mount assembly 64 that provides for lateral adjustment, as particularly shown in FIGS. 4 and 5.

The mount assembly 64 includes an outer vertical plate 68 supported from a base 70 that is bolted to the side channel member by suitable bolts 72. An inner vertical plate 74 is connected to the upright member 56 by bolts 75 (omitted from FIG. 4 for purposes of clarity). A pair of bolts 76 and 78 extend through untapped holes 80 and 82, respectively, in the outer vertical plates 68 and are threaded into tapped holes 84 and 86, respectively, in the inner plate 74. Another pair of vertically spaced bolts 88 and 90 are threaded through tapped holes 92 and 94, respectively, in the outer plate 68 and bear against the face of the inner plate 74.

In the embodiment illustrated, each printhead station 32 and 33 is shown as having two print heads 100 and 101 each supported on a conventional print head mount 102, and two print heads 104 and 106, each of which is supported by a special print head mount 108 of the present invention. Each print head mount 108 includes a horizontal plate 110 joined by suitable support plates 112, 114 and 116 to the channel 40 (or 38). As shown in FIG. 8, inboard and outboard angle members 118 and 120 are joined to the horizontal plate 110. The angle members 118 and 120 have vertical flanges 122 and 124, respectively. Two horizontal rods 126 and 128 extend between and are supported in fixed positions by the vertical flanges 122 and 124. The rods 126 and 128 are parallel to one another and may be square and cross section as shown in FIG. 9.

Each horizontal rod 126 and 128 supports inboard and outboard slide bearings 130 and 132. A channel member 133 having a top wall 134 and side walls 136 and 138 is connected to the slide bearings 130 and 132 by suitable means such as bolts 140. The channel member 133 may have chamfered corners 142 if desired.

An inboard connecting plate 144 is joined to the inboard angle member 118. An outboard connecting plate 146 is joined to the channel member 133. A tension spring 148 is connected between the mounting plates 144 and 146. The mounting plates 144 and 146 may have a plurality of holes 150 and 152, respectively, to allow adjustment of the tension of the spring 148. The spring 148 biases the channel member 133 in an inboard direction as illustrated in FIG. 8 and will yield to allow the channel member 133 to slide outboard from the position shown in FIG. 8 upon the application of forces caused by packages on the conveyor 24.

Figure 7:
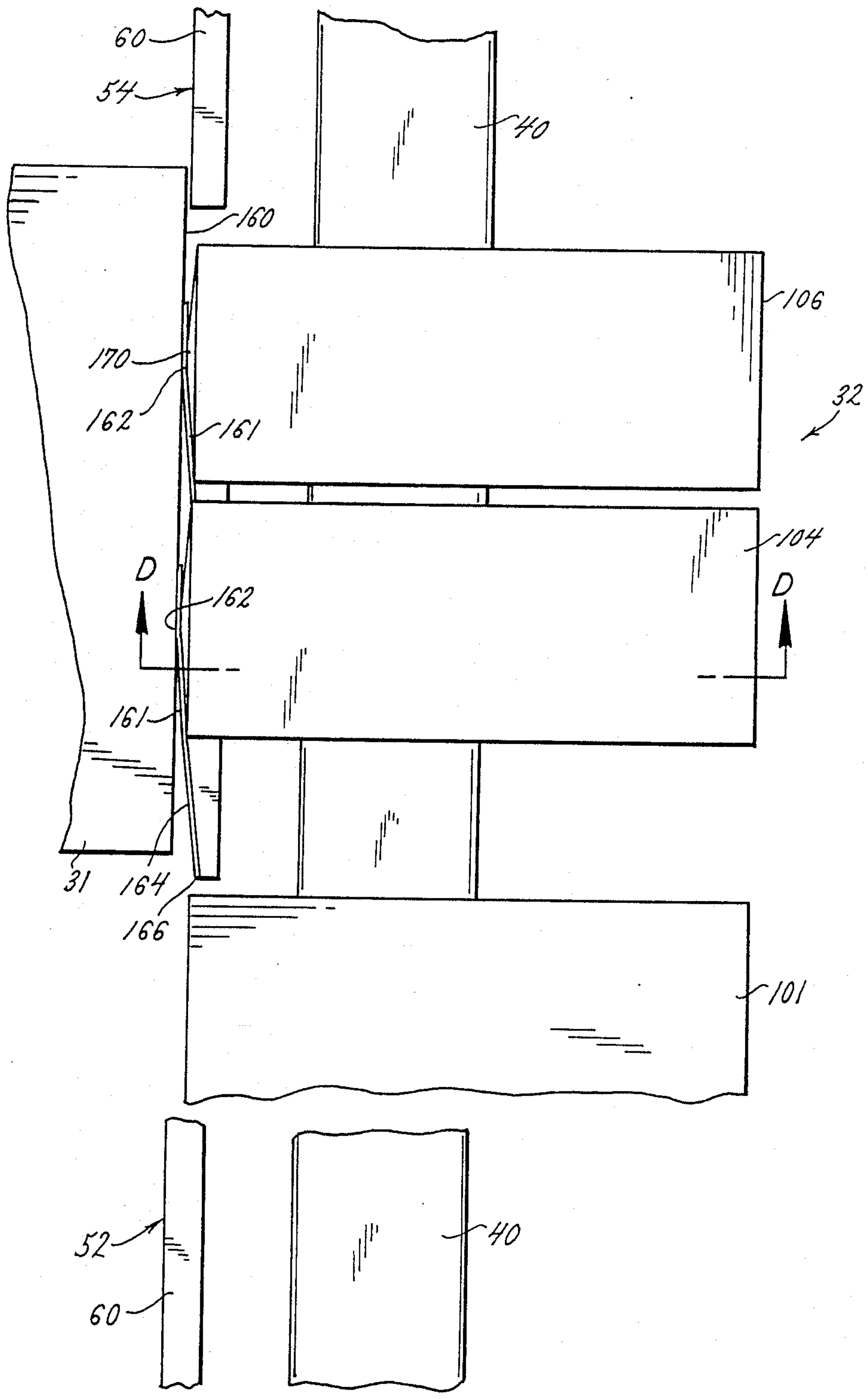
FIG. 7 is an enlarged partial top plan view in section, as viewed along the plane of the line C—C of FIG. 6.

As shown in FIGS. 6 and 7, each print head 104 and 106 has a nozzle block 156 typically comprising a vertical array of ink orifice nozzles. The face 158 of the nozzle block 156 should be spaced a predetermined distance from the opposing surface 160 of the package 31, as shown in FIGS. 6 and 7. This distance is established and maintained constant by a cam plate 161. The cam plate 161 has a cam face section 162 that bears against a portion of the package surface 160 that is directly opposite the nozzle block 158. The cam plate 161 also has a cam face section 164 that is inclined away from the cam face section 162 in an outboard direction to position its leading edge 166 outboard of the inner surface of the guide rail section 52 (as well as the inboard extreme of the print head 101).

As thus formed, the cam plate leading edge 166 is always outboard of the approaching package 31 so that the outboard cam face section 164 can guide and direct the package onto the cam face section 162. The cam face section 162 is spaced from the face 158 of the nozzle block 156 by precisely the desired distance, such as about one-sixteenth inch, so that the distance travelled by the ink droplets will be maintained at the desired length.

A tapered nozzle guard 170 may be positioned above the nozzle block 156. The cam face section 162 is slightly inboard of the nozzle guard 170. The nozzle guard provides secondary protection for the nozzle block 156 in the event of inadvertent tilting of a package 31.

Operation

In the operation of this ink jet print head holder 20, it is first determined what size of packages 31 (and 36 and 37) will be conveyed past the print head stations 32 and 33. It will be understood that in any given run, the packages 31 will all be of the same nominal size but that the size tolerances in packages are such that the width of the packages can vary by as much as one-half inch. Accordingly, the crank 46 is operated to adjust the lateral positions of the channel members 38 and 40 so that the path between the rail sections 48 and 50 on one side of the conveyor 24 and the rail sections 52 and 54 on the other side of the conveyor will accommodate the widest package within the width tolerance allowance.

Figure 4:
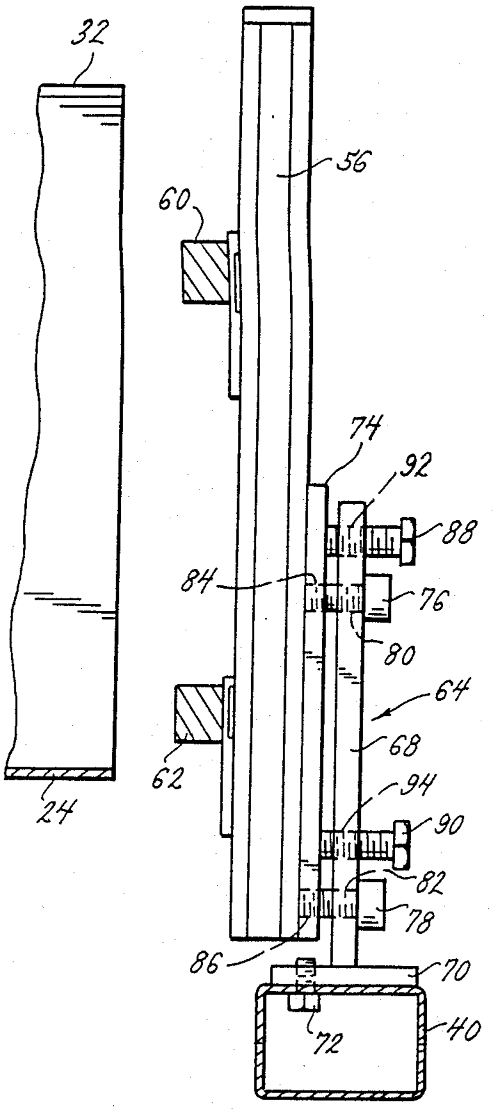
FIG. 4 is an enlarged view in section taken along the plane of the line A—A of FIG. 1.
Figure 5:
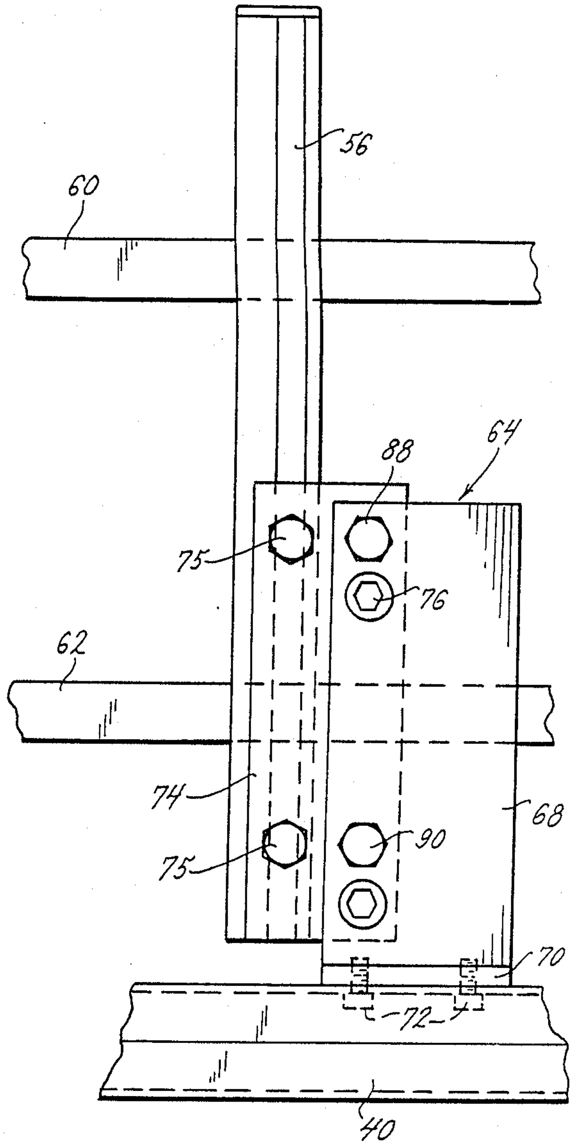
FIG. 5 is an enlarged side view of the side rail mounting means, as viewed from the right side of FIG. 4.

As a result, some narrower packages will be guided between the side rail sections 48 and 52 but may not contact a side rail. This condition is illustrated in FIG. 4. Therefore, the side rail sections 48 and 52 can be set to provide gross lateral control of the position of the package 31 relative to the print head sections 32 and 33, but there can be considerable variation in the distance of a surface of the package that is to be a printing substrate 160 from the nozzle block 158 of a print head.

The slide mount 108 allows each print head 104 and 106 to compensate for this variation. A tension spring 148 constantly biases the print heads 104 and 106 toward an extreme inboard position. Therefore, even though a package 31 at the narrowest end of the tolerance extreme passes between the print head stations 32 and 33, the slide mounts 108 will be biased inwardly so that the cam face section 162 is always held against the opposing package face 160 (see FIG. 6).

The lateral positions of the rail sections 48, 50, 52 and 54 can be adjusted by the mount assembly 64. Operating the bolts 76 and 78 draws the plates 68 and 74 closer together and operation of the bolts 88 and 90 can then lock them in place. Alternatively, these bolts can be operated to increase the space between the plates 68 and 74. This operation allows the side rail sections to be adjusted laterally relative to the print head sections 32 and 33. The result is that the cam face sections 164, and the lead edge 166, are always outboard of the rail sections, such as the rail section 52 as illustrated in FIG. 7.

The nozzle guard 170 at the upper portion of the print head is always slightly spaced from the package face 160 and therefore functions as a secondary guard in the event the package is tilted.

There are various changes and modifications which may be made to the invention as would be apparent to those skilled in the art. However, these changes or modifications are included in the teaching of the disclosure, and it is intended that the invention be limited only by the scope of the claims appended hereto.

What is claimed is:

1. In ink jet printing apparatus used to apply printing to an object such as a carton or the like that is conveyed by a conveying means past the printing apparatus: an ink jet head holder comprising bracket means for supporting a print head from a frame in a position to eject ink form at least one print head nozzle generally normal to the path of movement of a print-receiving surface on a moving object, and means continuously responsive to variations in the position of the print-receiving surface transverse to said path of movement and responsive to undulations in the print-receiving surface for continuously maintaining constant the spatial relationship between the print head and that portion or the print-receiving surface that is in the path of the ejected ink, said maintaining means being responsive to such variations and undulations which at about the moment of such response lie in alignment with said portion of the print-receiving surface that is in the path of the ejected in, said alignment being generally normal to the path of movement of said moving object.

2. The ink jet head holder of claim 1 including second bracket means for supporting a second print head from the frame in a position to eject ink generally normal to the path of movement of a second print receiving surface on the object, and second means continuously responsive to variations in the position of the second print-receiving surface transverse to said path of movement and responsive to undulations in the print-receiving surface for continuously maintaining constant the spacial relationship between the second print head and that portion of the second print-receiving surface that is in the path of ink ejected from the second print head, said second maintaining means being responsive to such variations and undulations which at about the moment of such response lie in alignment with said portion of the print-receiving surface that is in the path of the ejected ink, said alignment being generated normal to the path of movement of said moving object.

3. The ink jet head holder of claim 2 including means extending between said print heads for conveying the object past the print heads.

4. The ink jet head holder of claim 1 including guide rail means for guiding the object past the print head, and means for adjusting the relative transverse positions of the print head and the guide rail means.

5. In ink jet printing apparatus used to apply printing to a carbon or the like: an ink jet head holder comprising bracket means for supporting a print head from a frame in a position to eject ink from at least one print head nozzle generally normal to the path of movement of a print-receiving surface on a moving object, and means continuously responsive to variations in the position of the print-receiving surface transverse to said path of movement and responsive to undulations in the print-receiving surface for continuously maintaining constant the spatial relationship between the print head and that portion of the print-receiving surface that is in the path of the ejected ink, said maintaining means being responsive to such variations and undulations and undulations which at about the moment of such response lie in alignment with said portion of the print-receiving surface that is in the path of the ejected ink, said alignment being generally normal to the path of movement of said moving object, said bracket means including a generally horizontal rod and bearing means, the rod extending through and being slidable within the bearing means in a direction transverse to said path of movement, one of the rod or bearing means being connected to a portion of the frame, the other of the rod or bearing means being connected to the print head.

6. The ink jet head holder of claim 5 including a second generally horizontal rod and bearing means substantially identical to the first-named horizontal rod and bearing means, the rods being substantially parallel.

7. In ink jet printing apparatus used to apply printing to a carton or the like: an ink jet head holder comprising:

(a) bracket means for supporting a print head from a frame in a position to eject ink form at least one print head nozzle generally normal to the path of movement of a print-receiving surface on a moving object;

(b) means continuously responsive to variations in the position of the print-receiving surface transverse to said path of movement and responsive to undulations in the print-receiving surface for continuously maintaining constant the spatial relationship between the print head and that portion of the print-receiving surface that is in the path of the ejected ink, said maintaining means being responsive to such variations and undulations which at about the moment of such response lie in alignment with said portion of the print-receiving surface that is in the path of the ejected ink, said alignment being generally normal to the path of movement of said moving object;

(c) cam means on the print head for intercepting the object as it moves toward the print head and for guiding the object past the print head; and (d) contact means on the print head having a contact face in contact with said print-receiving surface as the object passes the print head.

8. The ink jet head holder of claim 7 wherein the contact means is integral with the cam means.

9. The ink jet head holder of claim 8 wherein the cam means comprises a cam plate having a cam surface supported by the print head and having a lead end having a cam face extending toward the object as the object approaches the print head, the lead end being at an angle and convergent to the path of movement of the object to assure initial contact of the object with the cam face.

10. The ink jet head holder of claim 9 including guide rail means for guiding the object toward the cam plate, the cam face of the lead end being laterally outboard of the guide rail means.

11. The ink jet head holder of claim 10 including means for varying the relative transverse positions of the cam face and the guide rail means independent of the maintaining means.

12. The ink jet head holder of claim 11 wherein the means for varying comprises a plate on the guide rail means, a plate on the frame, and bolts for adjusting the relative positions of the plates and for locking them in selected relative positions.

13. In ink jet printing apparatus of the kind having a frame, a plurality of ink jet print heads, means for conveying at least one article defining opposed substrates past and between the print heads, and means for emitting ink droplets from nozzles supported by the print heads generally normal toward and onto the substrates as the substrates pass the print heads, an ink jet head holder for each print head comprising spaced, generally parallel guide rails, means for supporting the guide rails on opposite longitudinal sides of the conveying means so that the article can be conveyed between the guide rails, means for supporting the print heads from the frame adjacent the guide rails, and means for varying the positions of the print heads normal to the direction of movement of the conveying means in response to variations in the positions of the substrates normal to the conveying means for maintaining constant the distance between the substrates and the respective print heads, said maintaining means being responsive to such variations as said variations pass said print heads.

14. The ink jet printing apparatus of claim 13 including means for adjusting the span between the guide rails and between the print heads.

15. The ink jet printing apparatus of claim 14 including means for adjusting the lateral positions of the guide rails relative to the print heads.

16. The ink jet printing apparatus of claim 13 wherein the means for varying the positions of the print heads comprises a mount for each print head permitting lateral movement of the print head, a spacer on each print head, and means for maintaining the spacer in contact with a substrate to maintain a substantially constant distance between the substrate and the print head nozzles.

* * * * *